(12) United States Patent
Huggins et al.

(10) Patent No.: US 8,829,140 B2
(45) Date of Patent: Sep. 9, 2014

(54) POLYSILOXANE-POLYORGANO BLOCK COPOLYMERS

(75) Inventors: John M. Huggins, Leverkusen (DE); Hubertus Eversheim, Wermelskirchen (DE)

(73) Assignee: Momentive Performance Materials Inc., Waterford, NY (US)

( * ) Notice: Subject to any disclaimer, the term of this patent is extended or adjusted under 35 U.S.C. 154(b) by 114 days.

(21) Appl. No.: 13/472,871

(22) Filed: May 16, 2012

(65) Prior Publication Data

US 2012/0296051 A1    Nov. 22, 2012

Related U.S. Application Data

(60) Provisional application No. 61/486,994, filed on May 17, 2011.

(51) Int. Cl.
*C08G 77/445* (2006.01)
*C08G 77/448* (2006.01)
*C08G 77/14* (2006.01)

(52) U.S. Cl.
CPC .............. *C08G 77/448* (2013.01); *C08G 77/14* (2013.01)
USPC ............................................. 528/29; 528/41

(58) Field of Classification Search
USPC ..................................................... 528/29, 41
See application file for complete search history.

(56) References Cited

U.S. PATENT DOCUMENTS

| 3,189,662 A | 6/1965 | Vaughn, Jr. |
| 4,732,949 A | 3/1988 | Paul et al. |
| 5,112,925 A | 5/1992 | Horlacher et al. |
| 5,130,460 A | 7/1992 | Kamei et al. |
| 5,488,086 A | 1/1996 | Umeda et al. |
| 5,502,134 A | 3/1996 | Okamoto et al. |
| 5,504,177 A | 4/1996 | King, Jr. et al. |
| 5,783,651 A | 7/1998 | König et al. |
| 6,066,700 A | 5/2000 | König et al. |
| 6,072,011 A | 6/2000 | Hoover |
| 6,258,968 B1 | 7/2001 | Eversheim et al. |
| 6,664,342 B1 | 12/2003 | Kohler et al. |
| 2004/0071741 A1 | 4/2004 | Derian |

OTHER PUBLICATIONS

"Palladium- and Platinum-Catalyzed Coupling Reactions of Allyloxy Aromatics with Hydridosilanes and Hydridosiloxanes", Sellinger et al. Journal of Polymer Science, vol. 32, pp. 3069-3089, Oct. 1994.*

* cited by examiner

*Primary Examiner* — Margaret Moore
(74) *Attorney, Agent, or Firm* — Dominick G. Vicari; Joseph S. Ostroff

(57) ABSTRACT

Disclosed herein is a process for the production of a polysiloxane-polyorgano block copolymer. The process includes reacting a reaction mixture containing (a) an ester-functional polydiorganosiloxane and (b) a bisphenolic compound or a bisphenolic compound oligomer. This process has the advantage of yielding block copolymers with controlled block structures and avoiding the impurities that may be carried over from the conventional hydroxyaryloxy-terminated-polydiorganosiloxanes.

16 Claims, No Drawings

POLYSILOXANE-POLYORGANO BLOCK COPOLYMERS

CROSS-REFERENCE TO RELATED APPLICATION

This application claims priority to U.S. provisional application No. 61/486,994 filed May 17, 2011, which is herein incorporated by reference in its entirety.

FIELD OF INVENTION

The present invention relates to polysiloxane-polyorgano block copolymers of controlled structures, their preparation, and the articles made therefrom. The present invention is also concerned with ester-functional polysiloxanes suitable to be incorporated into polysiloxane-polyorgano block copolymers.

BACKGROUND OF THE INVENTION

Polydiorganosiloxane-polycarbonate block copolymers are generally known. Typically, these copolymers are prepared either from a two-phase boundary process or a solvent-free melt process by reacting hydroxyaryloxy-terminated siloxanes with bisphenolic compounds or the oligomers derived therefrom.

Illustratively, U.S. Pat. No. 4,732,949 describes a two-phase boundary process for the production of a polydiorganosiloxane-polycarbonate block copolymer. The process includes reacting (a) a linear hydroxyaryloxy-terminated siloxane having the general structure (I)

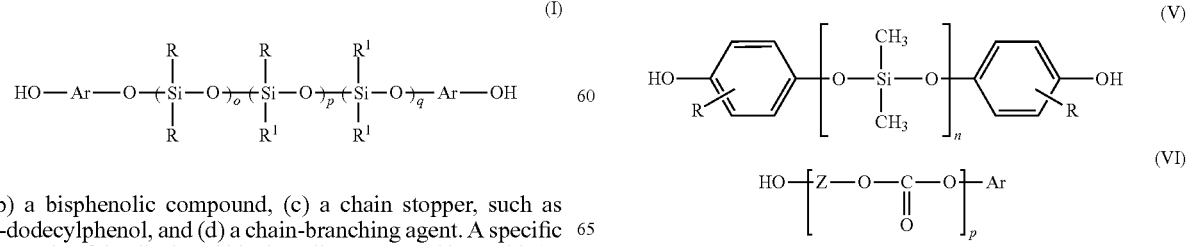

(b) a bisphenolic compound, (c) a chain stopper, such as p-dodecylphenol, and (d) a chain-branching agent. A specific example of the disclosed bisphenolic compound is 2,2-bis(4-hydroxyphenyl)propane (II), wherein $Y^1$-$Y^4$ are all hydrogen.

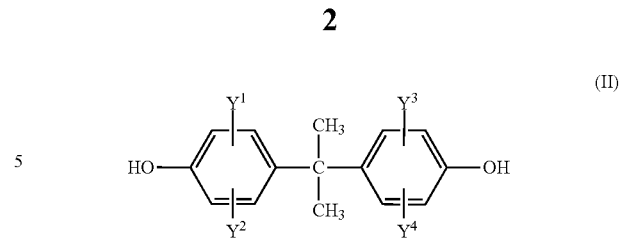

U.S. Pat. No. 5,112,925 describes a two-phase boundary process for preparing a polydiorganosiloxane-polycarbonate block copolymer by reacting (a) a diphenol and (b) a hydroxyaryloxy-terminated siloxane wherein the aryl moiety in the terminal portion of the siloxane is a divalent radical of the general formula (III) or formula (IV):

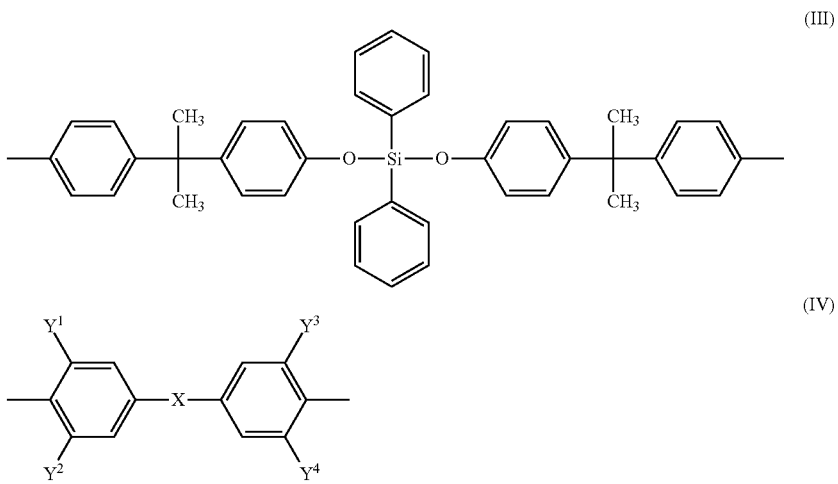

According to the patentees, the copolymers derived from the siloxanes having the above described aryl moiety have improved surface tension as compared to the copolymers derived the siloxanes that do not contain those specific aryl moieties.

U.S. Pat. No. 5,783,651 describes a solvent-free melt process for preparing polydiorganosiloxane-polycarbonate block copolymers from (a) hydroxyaryloxy-terminated siloxanes of the general structure (I), (b) bisphenolic compounds, and (c) carbonic acid diaryl esters using specific quaternary ammonium or quaternary phosphonium compounds as catalysts.

U.S. Pat. No. 6,066,700 describes a solvent-free melt process for preparing polydiorganosiloxane-polycarbonate block copolymers from hydroxyaryloxy-terminated siloxanes of the general structure (V) and an oligocarbonate of the general structure (VI):

The oligocarbonates of formula (VI) are obtained from bisphenolic compounds and the diaryl carbonates (VII), whereby Ar=C$_6$H$_5$ is preferred.

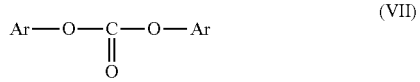

There are three general paths to linear hydroxyaryloxy-terminated siloxanes of the general structure (I) known in the prior art: (A) U.S. Pat. No. 3,189,662 describes the reaction of chloroterminated polysiloxanes with bisphenolic compounds eliminating hydrochloric acid as the byproduct; (B) U.S. Pat. No. 4,732,949 describes the reaction of bisphenolic compounds with α,ω-bisacyloxypolydiorganosiloxanes in a solvent, and (C) U.S. Pat. No. 6,258,968 describes the reaction of bisphenolic compounds such as hydroquinone with a cyclic dialkyl siloxane such as octamethylcyclotetrasiloxane in a solvent, whereby an acid catalyst is used and water is removed from the reaction mixture by distillation.

Unfortunately, all these paths to linear hydroxyaryloxy-terminated siloxanes suffer from the disadvantage that both hydroxy functions of the bisphenolic reactant are equally likely to react with the siloxane substrate to produce, along with the desired hydroxyaryloxy-terminated siloxane, also byproducts, for example, polymers containing groups of the general structure (VIII):

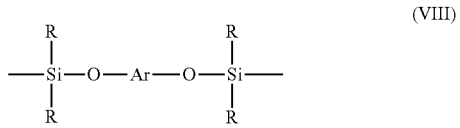

These byproducts, if formed, represent undesirable impurities if incorporated into the polysiloxane-polyorgano block copolymers.

In addition, hydroxyaryloxy-terminated siloxanes prepared by the prior art processes tend to have batch to batch variations in terms of chain length because it is difficult to control the number of oligomer repeat units "m" shown in structure IX below in these siloxanes.

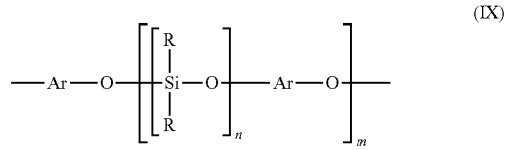

Such a variation in the chain length of polysiloxane would lead to structure variations of the resulting polysiloxane-polyorgano block copolymer, which in turn may effect the properties of the copolymer.

There are methods to control the number of oligomer repeat units "m". For example, U.S. Pat. No. 4,732,949 describes using high dilutions of solvent and excess bisphenolic compounds to control the number of oligomer repeat units "m". However, such a process is not cost-effective.

As an alternative to hydroxyaryloxy-terminated siloxanes, carbonate-terminated siloxanes have also been used to prepare polysiloxane-polycarbonate block copolymers. For example, U.S. Pat. No. 5,504,177 describes a solvent-free melt process for preparing polydiorganosiloxane-polycarbonate block copolymers using Si—O—C-free carbonate-terminated siloxanes of the general formula (X):

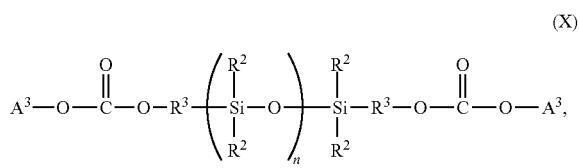

However, this path has the disadvantage that it requires the use of expensive p-allylphenolic precursors for the group R$^3$ and the use of platinum catalysts, which both add to the cost of the process.

Accordingly, there is a need for a cost-effective process to produce polysiloxane-polyorgano block copolymers having a controlled siloxane block structure, yet at the same time avoiding the formation of undesired byproducts. The present invention provides an answer to that need.

SUMMARY OF THE INVENTION

In one aspect, the present invention relates to a process for the production of a polysiloxane-polyorgano block copolymer comprising reacting a reaction mixture containing (a) an ester-functional polydiorganosiloxane and (b) a bisphenolic compound or a bisphenolic compound oligomer.

The ester-functional polydiorganosiloxane suitable for use in the process of the invention is a compound of the general formula (XI):

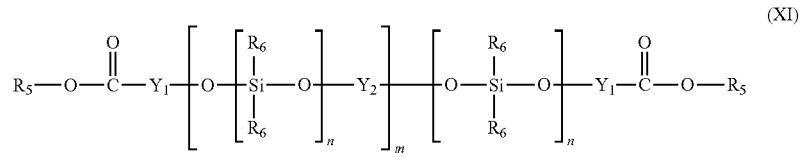

wherein Y$_1$ and Y$_2$ are independently a divalent C6-C30 aryl, alkyl, alkylaryl or aryloxy group, R$_5$ and R$_6$ are independently C1-C20 alkyl, alkylaryl, or aryl groups, n has a value of from 10 to 400, and m has a value of from 0 to 10.

The bisphenolic compound suitable for use in the preparation of polysiloxane-polyorgano copolymers is of the general formula (XIII) or the oligomers thereof

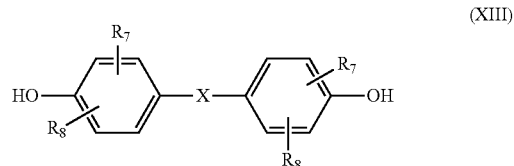

wherein $R_7$ and $R_8$ are independently selected from the group consisting of hydrogen, halogen, C1 to C8 alkyl, C5 or C6 cycloalkyl, C6 to C10 aryl, and C7 to C12 aralkyl, and X is a single bond, —$CH_2$—,

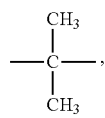

O, S, $SO_2$,

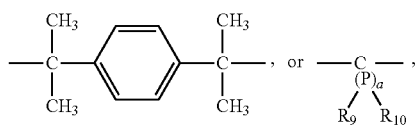

wherein a is an integer of from 4 to 7, $R_9$ and $R_{10}$ are independently hydrogen, or C1-C6 alkyl, P is carbon, provided that on at least one ring carbon atom, $R_9$ and $R_{10}$ both represent C1-C6 alkyl.

Suitable oligomers include polycarbonate, polysulfone or polyester oligomers of the bisphenolic compound of formula (XIII).

In another aspect, the present invention relates to the polysiloxane-polyorgano block copolymers produced by the process of the invention. The polysiloxane-polyorgano block copolymer $(A-B)_n$ contains polydiorganosiloxane blocks (A) with from 10 to 400 diorganosiloxane units and polycarbonate, polysulfone and/or polyester blocks (B) with from 2 to 150 bisoxyorgano groups, wherein at least 50% of the blocks (A) and (B) are connected by an ester linkage of the structure (XX)

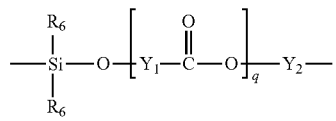

wherein q is 1 to 20, $R_6$ is a monovalent C1-C20 alkyl, alkylaryl, or aryl group, $Y_1$ is a divalent C6-C30 aryl, alkyl, alkylaryl, bisaryl, bisalkylaryl, bisoxyalkylaryl group and $Y_2$ is a terminal divalent C6-C30 alkyl, aryl, bisaryl, bisarylalkyl, or bisaryloxy group of the polycarbonate, polysulfone or polyester polymer blocks (B).

In yet another aspect, the present invention relates to articles of manufacture comprising the polysiloxane-polyorgano copolymers of the invention.

These and other aspects will become apparent upon reading the detailed description of the invention.

DETAILED DESCRIPTION OF THE PREFERRED EMBODIMENTS

It has been found that unlike hydroxyaryloxy-terminated siloxanes, ester-functional siloxanes can be made with controlled number of oligomer repeat units, yet at the same time avoiding the uncontrolled formation of the byproducts that are incorporated into polycarbonates, polysulfones or polyesters.

The ester-terminated siloxanes of the invention can co-condensate with bisphenolic compounds or biphenolic compound oligomers to produce polysiloxane-polyorgano copolymers which have controlled block structures but without the impurities that may be carried over from the conventional hydroxyaryloxy-siloxanes.

Ester-Functional Polydiorganosiloxane

In one embodiment of the invention, there is provided an ester-functional polydiorganosiloxane represented by the general formula (XI):

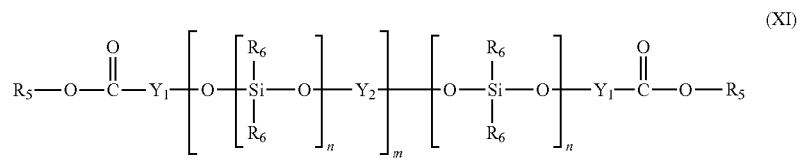

wherein $Y_1$ and $Y_2$ are independently a divalent C6-C30 aryl, alkyl, alkylaryl or aryloxy group, $R_5$ and $R_6$ are independently C1-C20 alkyl, alkylaryl, or aryl groups, n has a value of from 10 to 400, m has a value of from 0 to 10. In particular, m may be 0, n may be from 15 to 80, specifically from 15 to 50, and $R_5$ may be methyl, ethyl, propyl, butyl or phenyl. In one embodiment, at least 50% of $R_6$ are methyl groups.

Specifically, the ester-functional polydiorganosiloxanes of the general formula (XI) may have a structure with defined amounts of bis-oxyaryl groups and p-oxybenzoate terminal groups represented by formula (XII):

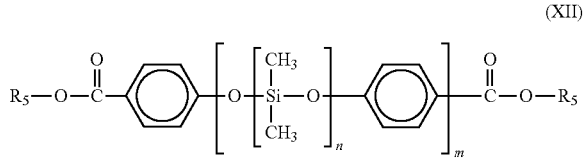

wherein n has a value of 10 to 400, specifically from 15 to 80, more specifically from 15 to 50, and m has a value of 1 to 10.

More specifically, when m is 0, the polydiorganosiloxane of the invention is represented by the general formula (XVI):

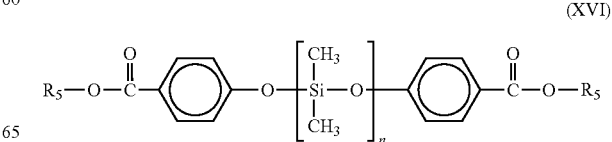

wherein $R_5$ may be a methyl, ethyl, propyl, butyl or phenyl group, n may be from 10 to 400, specifically from 15 to 80, more specifically from 15 to 50.

The ester-functional polydiorganosiloxanes of the general formula (XI) can be prepared, for example, by the reaction of (a) α,ω-bisacyloxypolydiorganosiloxanes with (b) hydroxyorganoesters, or mixtures of hydroxyorganoesters and bisphenolic compounds.

Suitable α,ω-bisacyloxypolydiorganosiloxanes include compounds represented by the general formula (XVII):

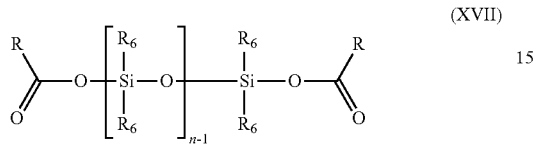

(XVII)

wherein R is a monovalent C1-C20 organic group such as a methyl or ethyl group, $R_6$ is a C1-C20 alkyl, alkylaryl, or aryl group, and n has a value of from 10 to 400, specifically from 15 to 80, more specifically from 15 to 50.

Suitable hydroxyorganoesters include compounds represented by the general formula (XVIII):

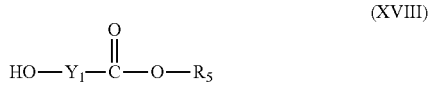

(XVIII)

wherein $Y_1$ is a divalent C6-C30 aryl, alkyl, alkylaryl or aryloxy group, $R_5$ is a C1-C20 alkyl, alkylaryl, or aryl group.

Representative and non-limiting examples of hydroxyorganoesters useful in the preparation of ester-functional polydiorganosiloxanes of the invention include hydroxybenzoate esters, the hydroxy esters of biphenyl, diphenylether, benzophenone, naphthalene and like, such as

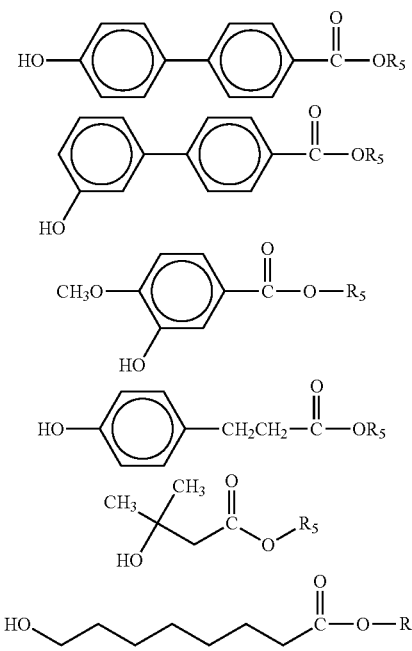

-continued

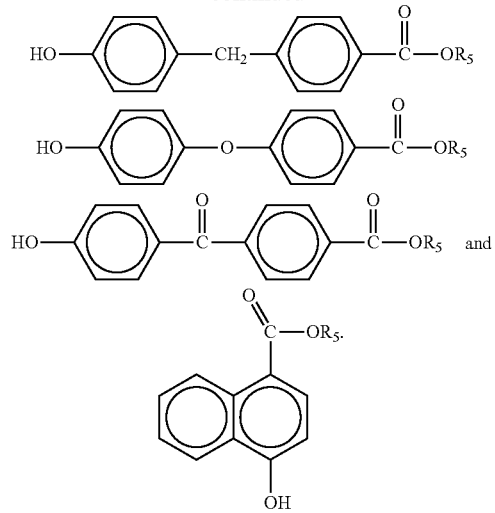

In some embodiments, the hydroxyorganoester of formula (XVIII) is a hydroxyarylester wherein other non-hydrogen substituents may be present on the aryl rings. Exemplary substituents include C1-C8 alkyl, alkyoxy, such as —$OCH_3$, or halogen. Representative and non-limiting examples of hydroxyarylesters are the methyl, ethyl, propyl, butyl or phenyl esters of 3-hydroxybenzoic acid or 4-hydroxybenzoic acid.

Bisphenolic compounds suitable for use in the preparation of the ester-functional polydiroganosiloxanes are represented by the general formula (XIII):

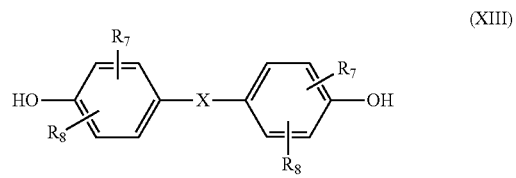

(XIII)

wherein $R_7$ and $R_8$ are independently selected from the group consisting of hydrogen, halogen, C1 to C8 alkyl, C5 or C6 cycloalkyl, C6 to C10 aryl, and C7 to C12 aralkyl, and X is a single bond, —$CH_2$—,

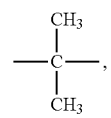

O, S, $SO_2$,

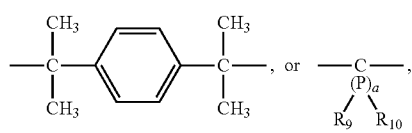

wherein a is an integer of from 4 to 7, $R_9$ and $R_{10}$ are independently hydrogen, or C1-C6 alkyl, P is carbon, provided on at least one ring carbon atom, $R_9$ and $R_{10}$ both represent C1-C6 alkyl.

In particular, in connection with the general formula (XIII), $R_7$ and $R_8$ may be hydrogen, chlorine, bromine, methyl, ethyl, propyl, cyclohexyl, phenyl, phenyl-C1-C4 alky such as benzyl, $R_9$ and $R_{10}$ may be hydrogen or methyl, and a may be 4 or 5.

The exemplary and non-limiting examples of bisphenolic compounds used to prepare the polydiorganosiloxane (XI) are hydroquinone, 2,2-bis(4-hydroxyphenyl)propane, 4,4-bishydroxybenzophenone, and bis(4-hydroxyphenyl)ether.

The ester-functional polydiorganosiloxanes (XI) can also be prepared from cyclosiloxanes and hydroxyorganoesters of the general formula (XVIII), and optionally bisphenolic compounds of the general formula (XIII) such as hydroquinone, 2,2-bis(4-hydroxyphenyl)propane, 4,4-bishydroxybenzophenone, and bis(4-hydroxyphenyl)ether, in the presence of catalysts with the removal of water.

Suitable cyclosiloxanes are not particularly limited. In some embodiments, the cyclosiloxanes are cyclic dialkylsiloxanes, particularly cyclic dialkylsiloxanes having 4, 5 or 6 silicon atoms, and bearing methyl residues as the alkyl residue.

The catalysts suitable for use in the preparation of ester-functional polydiorganosiloxanes from cyclosiloxanes include equilibration catalysts such as those disclosed in U.S. Pat. No. 6,258,968. Representative and non-limiting equilibration catalysts include perfluoroalkylsulfonic acids, specifically, C1-C6 perfluoroalkylsulfonic acids, individually or mixed with sulfuric acid, or alkali metal hydroxides, specifically potassium and caesium hydroxide.

Alternatively, the polydiorganosiloxane (XI) can be prepared from chloro-terminated polydiorganosiloxanes and hydroxyorganoesters of the general formula (XVIII), and optionally bisphenolic compounds of the general formula (XIII) such as hydroquinone, 2,2-bis(4-hydroxyphenyl)propane, 4,4-bishydroxybenzophenone, and bis(4-hydroxyphenyl)ether, with the elimination of hydrochloric acid.

Suitable chloro-terminated polydiorganosiloxanes include compounds represented by the general formula (XIV):

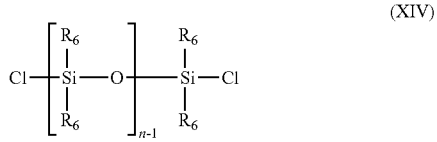

(XIV)

wherein $R_6$ is a C1-C20 alkyl, alkylaryl, or aryl group, and n has a value of from 10 to 400.

Polysiloxane-Polyorgano Block Copolymers

In another embodiment of the invention, there is provided a process to produce a polysiloxane-polyorgano block copolymer. The process includes reacting a reaction mixture containing (a) an ester-functional polydiorganosiloxane having the general formula (XI) and (b) a bisphenolic compound or a bisphenolic compound oligomer.

Suitable ester-functional polydiorganosiloxanes have been described above. Suitable bisphenolic compounds or their oligomers are described in U.S. Pat. Nos. 4,732,949 and 5,310,793.

In particular, a bisphenolic compound suitable for use in the preparation of the polysiloxane-polyorgano block copolymers is represented by the general formula (XIII) described above in the context of preparing ester-functional polydiorganosiloxanes.

Representative and non-limiting examples of the bisphenolic compounds include:

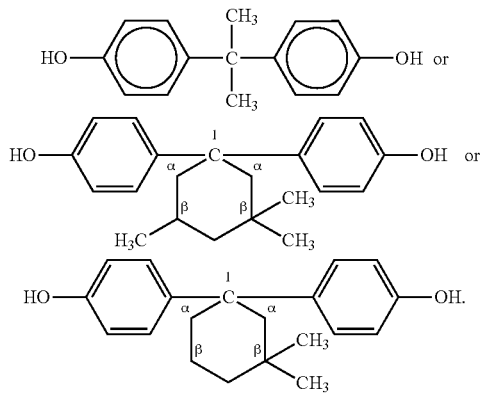

In some embodiments, component (b) of the reaction mixture may be a bisphenolic compound oligomer. Suitable oligomer includes polycarbonate, polysulfone or polyester oligomer of the bisphenolic compound of formula (XIII).

In particular, the bisphenolic compound oligomer may be a polycarbonate oligomer wherein at least 90% of the bisoxyaryl groups are derived from the bisphenolic compounds having formula (XIII) and at least 50% of the terminal groups are either phenolic (—$C_6H_4$OH), carbonate (—O—C(=O)—OR) or a benzoate ester group (—$C_6H_4$—C(=O)—OR).

More specifically, the polycarbonate oligomer may be represented by the general formula (XVI)

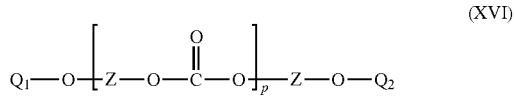

(XVI)

wherein Z is a divalent C6-C30 aryl, bisarylalkyl or bisaryloxy group, p is a number between 2 and 150, $Q_1$ and $Q_2$ are each independently hydrogen or a —C(=O)—OX group, and X is a C1-C20 alkyl, alkylaryl, or aryl group.

Suitable polysulfone oligomer of the bisphenolic compound (XIII) is of the general formula (XXIII) or formula (XXIV)

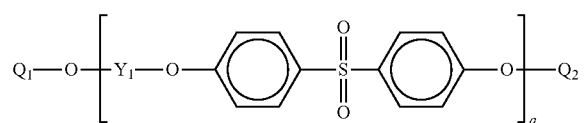

(XXIII)

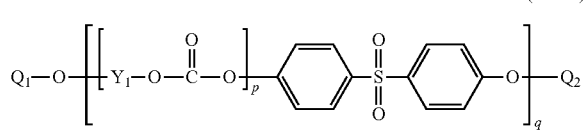

(XXIV)

wherein $Y_1$ is a divalent C6-C30 aryl, alkyl, alkylaryl or aryloxy group, p and q are independently between 1 and 150, $Q_1$ and $Q_2$ are each independently hydrogen or a —C(=O)—OX group, and X is a C1-C20 alkyl, alkylaryl, or aryl group.

Suitable polyester oligomer of the bisphenolic compound (XIII) is of the general formula (XXV):

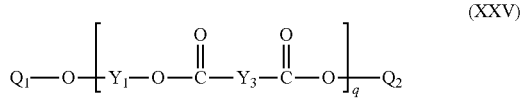 (XXV)

wherein $Y_1$ and $Y_3$ are each independently a divalent C6-C30 aryl, alkyl, alkylaryl or aryloxy group, q is 2 to 150, $Q_1$ and $Q_2$ are each independently hydrogen, a C1 to C20 alkyl, alkylaryl, aryl group, or a —C(=O)—OX group, and X is a C1-C20 alkyl, alkylaryl, or aryl group.

The polydiorganosiloxane-polyorgano block copolymers of the invention can be prepared by cocondensation of the ester-functional polydiorganosiloxanes of the general structure (XI) with bisphenolic compounds or bisphenolic compound oligomers, and optional chain stoppers under the conditions of a two-phase boundary process together with phosgene, followed by removal of solvent and the byproduct $R_5OH$.

Two-phase boundary processes are known and have been described for example in U.S. Pat. No. 4,732,949. The '949 patent is incorporated herein by reference in its entirety.

Suitable chain stoppers are known and include monoalkylphenols or dialkylphenols containing a total of 8 to 20 carbon atoms in the alkyl substituents. Specifically, monoalkylphenols or dialkylphenols can contain linear alkyl radicals and branched alkyl radicals. Representative and non-limiting examples of chain stoppers are p-isooctylphenol, p-nonylphenol, 3,4-di-tert-butylphenol, p-tert-octylphenol, p-dodecylphenol, 2-(3,5-dimethyl-heptyl)-phenol and 4-(3,5-dimethylheptyl)-phenol.

Instead of the monoalkylphenols or dialkylphenols, it is also possible to employ halogenocarbonic acid esters thereof.

Alternatively, the block copolymers can be prepared from the ester-functional siloxanes (XI) and bisphenolic compounds or bisphenolic compound oligomers in a solvent-free melt process. Co-condensation of the ester terminal groups of the polysiloxane with the hydroxy groups of the bisphenolic compounds or their oligomers leads to elimination of the alcohol $R_5OH$. This process may include the use of chain stoppers, such as monalkylphenols and dialkylphenols as described above, and condensation linkage groups, such as carbonic acid diesters, in particular the di-C6-C20-diaryl esters such as diphenyl carbonate and dicresyl carbonate, and catalysts as known in the art.

Specifically, suitable catalysts include quaternary ammonium compounds and/or quaternary phosphonium compounds as described for example in U.S. Pat. No. 5,783,651. Representative and non-limiting examples of the catalysts are: hexadecyltrimethylammonium tetraphenylhydridoborate, hexadecyltributylphosphonium tetraphenylhydridoborate, hexadecyltrimethylammonium fluoride, hexadecyltributylphosphonium fluoride.

A further alternative process to prepare the block copolymers of the invention is to react the ester-functional siloxanes (XI) with bisphenolic compounds in a first step, followed by reaction with further bisphenolic compounds or their oligomers under the reaction conditions of either a two-phase boundary process or a solvent-free melt process in a second step.

In one embodiment, the preparation of the block copolymers of the invention is from linear ester-functional siloxanes (XI) and oligomers of bisphenolic compounds in a melt process, using chain stoppers and diarylcarbonates or oligocarbonates to control the molecular weight of the resulting copolymer and catalysts to promote the reaction. Suitable catalysts are quaternary ammonium or quaternary phosphonium catalysts known in the art. More specifically, the block copolymers of the invention is prepared in a melt process at temperatures between 160 and 280° C. and employing a vacuum to assist in removal of byproducts, including alcohol $R_5OH$.

In an additional embodiment of the current invention, co-condensation of the polydiorganosiloxanes (XI) with bisphenolic compounds or bisphenolic compound oligomers can also include co-condensation with mono or diester compounds or polyester oligomers to form polydiorganosiloxane-polyester-polycarbonate triblock copolymers.

In yet another embodiment of the invention, there is provided a polysiloxane-polyorgano $(A-B)_n$ block copolymer prepared by the process according to the present invention. These block copolymers have many advantageous properties. They exhibit improved low temperature properties, such as improved impact resistance at temperatures of below −20° C. The block copolymers of the invention also exhibit improved rheological properties during molding. In addition, the block copolymers can have improved clarity, scratch and chemical resistance. Further, the block copolymers can have improved electrical insulation properties, as in the CTI test.

The block copolymers of the present invention contain polydiorganosiloxane blocks (A) with from about 10 to about 400 diorganosiloxane units and polycarbonate, polysulfone and/or polyester blocks (B) with from about 2 to about 150 bisoxyorgano groups, wherein at least 50% of the blocks (A) and (B) are connected by an ester linkage of the structure (XX)

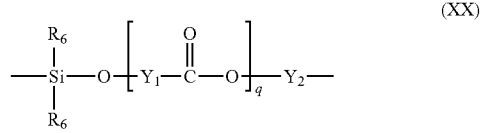 (XX)

wherein q is 1 to 20, $R_6$ is a monovalent C1-C20 alkyl, alkylaryl, or aryl group, $Y_1$ is a divalent C6-C30 aryl, alkyl, alkylaryl, bisaryl, bisalkylaryl, bisoxyalkylaryl group and $Y_2$ is a terminal divalent C6-C30 alkyl, aryl, bisaryl, bisarylalkyl, or bisaryloxy group of the polycarbonate, polysulfone or polyester polymer blocks (B).

In particular, in polydiorganosiloxane-polyorgano $(A-B)_n$ block copolymer of the invention, at least 90% of the diorganosiloxane blocks (A) are polydimethylsiloxanes and at least 90% of blocks (B) are polycarbonate polymers prepared from a bisphenolic compounds selected from the group consisting of

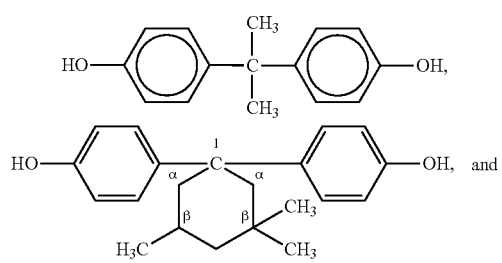

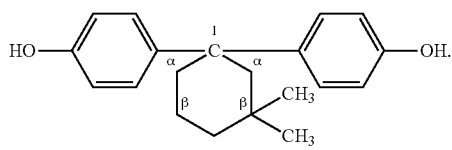

In addition, the linkage between blocks A and B has a structure of

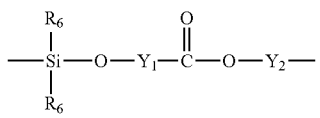

wherein $R_6$ is a monovalent C1-C20 alkyl, alkylaryl, or aryl group, $Y_1$ is a divalent C6-C30 aryl, alkyl, alkylaryl, bisaryl, bisalkylaryl, bisoxyalkylaryl group and $Y_2$ is a divalent alkyl, C6-C30 aryl, bisaryl, bisarylalkyl, or bisaryloxy group of the polycarbonate, polysulfone or polyester polymer blocks (B), specifically, $Y_1$ and $Y_2$ are C6-C30 aryl or alkylaryl group.

In connection with the preferred polydiorganosiloxane-polyorgano $(A-B)_n$ block copolymer of the invention, block A is represented by the general formula (XXIa) or (XXIb)

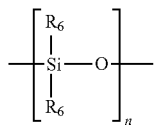 (XXIa)

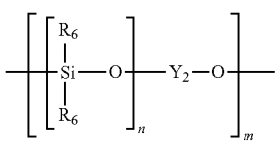 (XXIb)

wherein n is a number from 10 to 400, specifically from 15 to 80, more specifically from 15 to 50, m is a number from 1 to 10, $R_6$ is a monovalent C1-C20 alkyl, alkylaryl, or aryl group, and $Y_2$ is a divalent alkyl, C6-C30 aryl, bisaryl, bisarylalkyl, or bisaryloxy group, and block B is represented by the general formula (XXII)

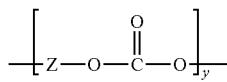 (XXII)

wherein Z is a divalent C6-C30 aryl, bisarylalkyl or bisaryloxy group, and y is a number between 2 and 150.

The following examples are intended to illustrate, but in no way limit the scope of the present invention. All percentages are by weight based on the total weight of the composition and all temperatures are in degrees Celsius unless explicitly stated otherwise. All patent applications, patents, and other publications cited herein are incorporated by reference in their entireties.

EXAMPLES

Example 1

300 g of toluene and 890 g of octamethylcyclotetrasiloxane, 33.0 g hydroquinone and 36 g of p-hydroxybenzoic acid propylester were introduced into a reaction flask equipped with a stirrer, a thermometer, and a reflux condenser with a water separator. After the flask was inertised by purging with nitrogen, 0.9 g concentrated sulfuric acid and 0.45 g perfluorbutanesulfonic acid were added and the contents heated to reflux. After 4 hours at reflux a total of 7.0 g of water had collected in the water separator. The reaction was cooled to below 100° C. and 10 g of sodium carbonate was added. The mixture was stirred at 100° C. for 3 h. A test found less than 2 ppm residual acid. The solvent and volatiles were removed by distillation at 150° C. and <10 mbar. The product was cooled to below 30° C. and filtered through a Seitz K300 filter to remove the salts of neutralization. The resulting product has the following characteristics:

Viscosity (23° C.): 197 mPas

% solids (160° C., 15 min): 93.8%

$^1$H NMR (found): $C_3H_7O—C(=O)—C_6H_4—O[(Si(Me_2)O)_{36.7}]_{1.95}—C_6H_4—C(=O)—OC_3H_7$

Example 2

300 g of toluene and 740 g of octamethylcyclotetrasiloxane, 74 g p-hydroxybenzoic acid ethylester were introduced into a reaction flask equipped with a stirrer, a thermometer, and a reflux condenser with a water separator. After the flask was inertised by purging with nitrogen, 0.8 g concentrated sulfuric acid and 0.4 g perfluorbutanesulfonic acid were added and the contents heated to reflux. After 4 hours at reflux a total of 3.8 g of water had collected in the water separator. The reaction was cooled to below 100° C. and 10 g of sodium carbonate was added. The mixture was stirred at 100° C. for 3 h. A test found less than 2 ppm residual acid. The solvent and volatiles were removed by distillation at 150° C. and <15 mbar. The product was cooled to below 30° C. and filtered through a Seitz K300 filter to remove the salts of neutralization. The resulting product has the following characteristics:

Viscosity (23° C.): 47 mPas

% solids (160° C., 15 min): 88.3%

$^1$H NMR (found): $CH_3CH_2O—C(=O)—C_6H_4—O[(Si(Me_2)O)_{40}]—C_6H_4—C(=O)—OCH_3CH_3$ While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A process for the production of a polysiloxane-polyorgano block copolymer comprising reacting a reaction mixture containing (a) an ester-functional polydiorganosiloxane and (b) a bisphenolic compound or a bisphenolic compound oligomer, wherein the ester-functional polydiorganosiloxane is a compound of the general formula (XI)

(XI)

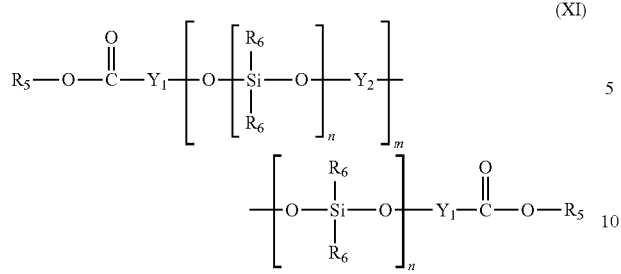

wherein Y₁ and Y₂ are independently a divalent C6-C30 aryl, alkyl, alkylaryl or aryloxy group, R5 and R6 are independently C1-C20 alkyl, alkylaryl, or aryl groups, n has a value of from 10 to 400, and m has a value of from 0 to 10.

2. The process of claim 1 wherein the ester-functional polydiorganosiloxane is of the general formula (XVI)

(XVI)

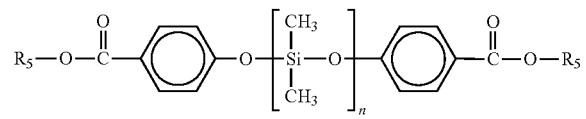

wherein $R_5$ is a C1-C20 alkyl, alkylaryl, or aryl group, and n has a value between 10 and 100.

3. The process of claim 1 wherein the bisphenolic compound is of the general formula (XIII)

(XIII)

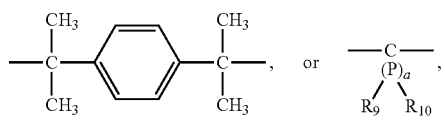

wherein $R_7$ and $R_8$ are independently selected from the group consisting of hydrogen, halogen, C1 to C8 alkyl, C5 or C6 cycloalkyl, C6 to C10 aryl, and C7 to C12 aralkyl, and X is a single bond, —CH₂—,

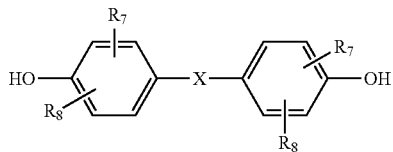

O, S, SO₂,

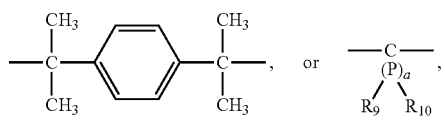

wherein a is an integer of from 4 to 7, $R_9$ and $R_{10}$ are independently hydrogen, or C1-C6 alkyl, P is carbon, provided on at least one ring carbon atom, $R_9$ and $R_{10}$ both represent C1-C6 alkyl.

4. The process of claim 3 wherein the bisphenolic compound is selected from the group consisting of

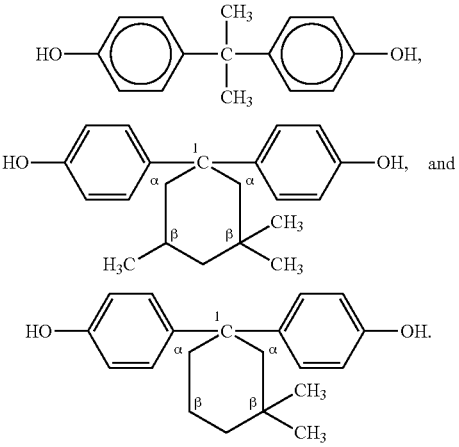

5. The process of claim 1 wherein the bisphenolic compound oligomer is a polycarbonate, polysulfone or polyester oligomer of a bisphenolic compound of the general formula (XIII)

(XIII)

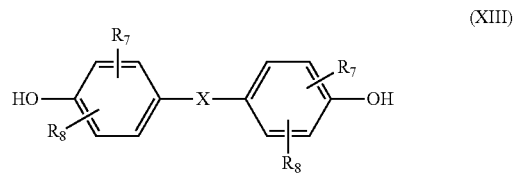

wherein $R_7$ and $R_8$ are independently selected from the group consisting of hydrogen, halogen, C1 to C8 alkyl, C5 or C6 cycloalkyl, C6 to C10 aryl, and C7 to C12 aralkyl, and X is a single bond, —CH₂—,

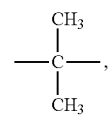

O, S, SO₂,

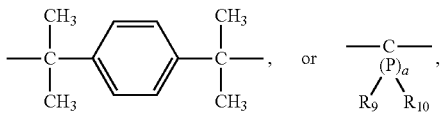

wherein a is an integer of from 4 to 7, $R_9$ and $R_{10}$ are independently hydrogen, or C1-C6 alkyl, P is carbon, provided on at least one ring carbon atom, $R_9$ and $R_{10}$ both represent C1-C6 alkyl.

6. The process of claim 5 wherein the bisphenolic compound oligomer is a polycarbonate, polysulfone or polyester oligomer of a bisphenolic compound selected from the group consisting of

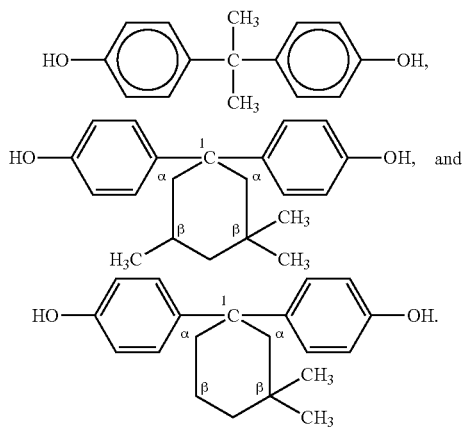

7. The process of claim 1 wherein the bisphenolic compound oligomer is of the general formula (XVI)

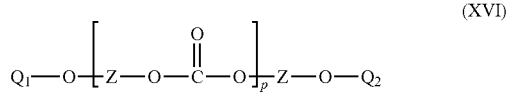

(XVI)

wherein z is a divalent C6-C30 aryl, bisarylalkyl or bisaryloxy group, p is a number between 2 and 150, $Q_1$ and $Q_2$ are each independently hydrogen or a —C(=O)—OX group, and X is a C1-C20 alkyl, alkylaryl, or aryl group.

8. The process of claim 1 wherein the bisphenolic compound oligomer is a polysulfone oligomer of the bisphenolic compound (XIII) having the general formula (XXIII) or formula (XXIV)

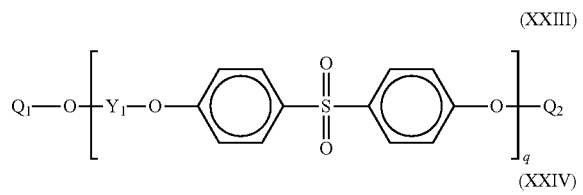

wherein $Y_1$ is a divalent C6-C30 aryl, alkyl, alkylaryl or aryloxy group, p and q are independently between 1 and 150, $Q_1$ and $Q_2$ are each independently hydrogen or a —C(=O)—OX grou, and X is a C1-C20 alkyl, alkylaryl, or aryl group.

9. The process of claim 1 wherein the bisphenolic compound oligomer is a polyester oligomer of the bisphenolic compound (XIII) having the general formula (XXV):

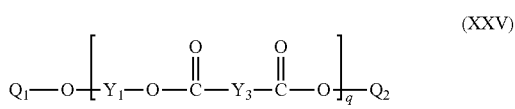

Wherein $Y_1$ and $Y_3$ are each independently a divalent C6-C30 aryl, alkyl, alkylaryl or aryloxy group, q is between 2 and 150, $Q_1$ and $Q_2$ are each independently hydrogen, a C1 to C20 alkyl, alkylaryl, aryl group, or a —C(=O)—OX group, and X is a C1-C20 alkyl, alkylaryl, or aryl group.

10. The process of claim 1 wherein (a) the ester-functional polydiorganosiloxane and (b) the bisphenolic compound of the bisphenolic compound oligomer are co-condensed with phosgene under the reaction conditions of a two-phase boundary process.

11. The process of claim 1 wherein (a) the ester-functional polydiorganosiloxane and (b) the bisphenolic compound of the bisphenolic compound oligomer are co-condensed under the reaction conditions of a solvent-free melt process.

12. The process of claim 1 wherein the reaction mixture additionally comprises at least one of a chain stopper or a catalyst.

13. A polyorganosiloxane-polyorgano block copolymer prepared by the process of claim 1.

14. An article of manufacture comprising the polysiloxane-polyorgano copolymer of claim 13.

15. An ester-functional polysiloxane of the general formula (XI):

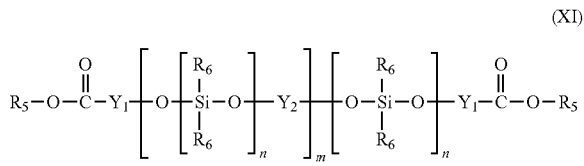

wherein $Y_1$ and $Y_2$ are independently a divalent C6-C30 aryl, alkyl, alkylaryl or aryloxy group, R5 and R6 are independently C1-C20 alkyl, alkylaryl, or aryl groups, n has a value of from 10 to 400, and m has a value of from 0 to 10.

16. The ester-functional polysiloxane of claim 15 wherein the polydiorganosiloxane is of the general formula (XVI)

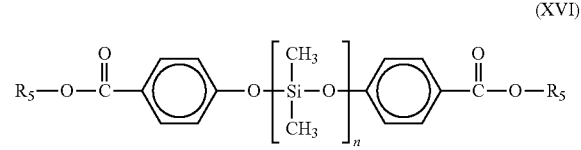

wherein $R_5$ is a C1-C20 alkyl, alkylaryl, or aryl group, and n has a value between 10 and 100.

* * * * *